United States Patent
Grindheim

[15] 3,680,384
[45] Aug. 1, 1972

[54] TWO WIRE TELEMETRY SYSTEM

[72] Inventor: Earl A. Grindheim, Minneapolis, Minn.

[73] Assignee: Rosemount Engineering Company, Minneapolis, Minn.

[22] Filed: Aug. 20, 1968

[21] Appl. No.: 753,937

Related U.S. Application Data

[63] Continuation-in-part of Ser. No. 661,988, Aug. 21, 1967, abandoned.

[52] U.S. Cl. ............73/361, 73/362 AR, 323/75 H, 340/186
[51] Int. Cl. ........G01k 7/12, G05f 1/58, G08c 19/02
[58] Field of Search ...........324/57 B, 62 B, 65 B, 30; 323/4, 22 T, 75 H, 75 N; 73/88.5, 362 R, 362 AR, 359, 361; 340/186

[56] References Cited

UNITED STATES PATENTS

| | | | |
|---|---|---|---|
| 3,139,579 | 6/1964 | Gravel | 324/57 |
| 3,182,252 | 5/1965 | Van Den Berg | 324/30 |
| 3,302,106 | 1/1967 | Shaw | 324/62 |
| 3,280,630 | 10/1966 | Latham | 73/362 AR |
| 3,503,261 | 3/1970 | Riester et al. | 73/362 AR |
| 3,517,556 | 6/1970 | Barker | 73/362 AR |
| 3,543,583 | 12/1970 | Holsten | 73/362 AR |
| 3,562,729 | 2/1971 | Hurd | 73/359 X |

*Primary Examiner*—Clement Swisher
*Assistant Examiner*—Frederick Shoon
*Attorney*—Dugger, Peterson, Johnson & Westman

[57] ABSTRACT

Measuring circuitry including a current controller which has an internal amplifier, and which controls current in response to differential input signals, is excited by an external power source. A reference voltage is established, and a separate voltage signal is also developed from a separate voltage source such as a thermocouple. The reference voltage is compared at an amplifier input with the voltage signal. A voltage is developed across a feedback resistor, and the total current through the circuitry adjusts until the feedback signal balances the signal inputs to the current controller. Total current drawn is thus a function of the voltage signals.

11 Claims, 5 Drawing Figures

INVENTOR.
EARL A. GRINDHEIM
BY
Dugger, Peterson, Johnson, & Westman

TWO WIRE TELEMETRY SYSTEM

CROSS-REFERENCE TO OTHER APPLICATIONS

This application is a continuation-in-part of my application, Ser. No. 661,988, filed Aug. 21, 1967 for TWO WIRE CURRENT TRANSMITTER RESPONSIVE TO A RESISTANCE SENSOR INPUT SIGNAL, now abandoned in favor of Ser. No. 14,748, filed Feb. 24, 1970.

BACKGROUND OF THE INVENTION

1. Field of the Invention

This invention relates to modulation or control of an electrical current which is dependent on the resistance of a sensing element where the two wires which carry power to the sensing circuitry are also used as the signal current transmission means. The measurement is one in which direct current power is supplied to remotely located sensing and current modifying circuitry which acts to control the total current flow proportional to the unbalance between two voltage signals.

2. Description of the Prior Art

The problem of conversion of a measurand (where "measurand" refers to the quantity or physical variable being measured) to an electrical signal and subsequent transmission of that signal to recorder and control equipment which may be located some distance away has been handled in many ways in the past. In general four-wire systems have been used where power is supplied via two of the wires and a voltage signal is transmitted via the other two wires. One of the voltage signal leads may be common to one of the power leads for some of these systems. Such a system typically requires use of an amplifier and/or other signal conditioning equipment at the point of measurement in order to supply an accurate signal representative of the measurand. The advantages of using the same two wires for power supply and information transmission has long been recognized and various designs of transmitting equipment have evolved. The prior art approach for force transducers where direct current power and signals are required has been to supply sufficient current to rebalance the force being measured by current through an electromagnetic arrangement. A small amount of current is routed through a null sensing circuit and amplifier which in turn controls the main current supply to the force balance coil. Such circuitry is widely used in industrial pressure measurements and an example is described in U.S. Pat. No. 3,274,833.

For temperature sensing transmitters self-balancing circuits using a motor driven potentiometer have commonly been used. Examples of various designs which have been developed in the past are given in the chapter titled "Measuring and Transmission Methods" of the book Handbook of Applied Instrumentation, McGraw-Hill Book Co., 1964, Library of Congress Catalog Card No. 62-21926. Those various designs all employ electro-mechanical elements of one type or another, to achieve self-balancing circuitry operating from a resistance signal or thermocouple signal. In almost all cases a two phase motor is relied on to provide adjustment of a potentiometer or variable condenser to achieve a balance condition. In one example, the current from a thermocouple passes through the field of a permanent magnet deflecting a beam against a calibrating spring. Beam deflection is sensed by other circuitry which supplies a high level, direct current signal suitable for transmitting to a recorder. A portion of the signal is shunted through a feedback coil which opposes the force caused by the thermocouple current thereby maintaining a balanced condition.

Since these previous designs have all required electromechanical devices they have the disadvantages of rather slow response, limited life associated with a loss of resolution where frictional contacts are involved, and poor performance under adverse environments such as wide variations in temperature, excessive humidity and dust.

SUMMARY OF THE INVENTION

The invention relates to an all electrical system for measuring the magnitude of remote voltage signals using only two wires for carrying power to the remote circuitry and also carrying the necessary information to indicate the signal level.

The total current flow is made to vary as a function of a voltage signal by providing a current controller that controls total current flow in the two wires in proportion to voltage differentials between input control signals, one of which is the signal to be measured. A feedback is provided, which is proportional to the total current in the two wires and which balances the voltage control signals when the total current flow has reached a proper level.

As shown, a bridge circuit provides means for balancing signals when a necessary minimum operational current is flowing from the controller, and also can provide linearization effects when one signal results from a sensor that forms a part of the bridge.

The resulting circuit does not require electromechanical devices such as rotary or linear motors and is free of the disadvantages of such devices. Conversion or transduction of a measurand signal into a direct current signal is accurately accomplished with a minimum of components resulting in a high performance transmitter having long life and high reliability.

It is therefore a primary object of this invention to provide a non-mechanical self-balancing circuit responsive to a measurand where the total current drawn by the circuit is proportional to the measurand.

DESCRIPTION OF THE PREFERRED EMBODIMENTS

Figures 1, 3:
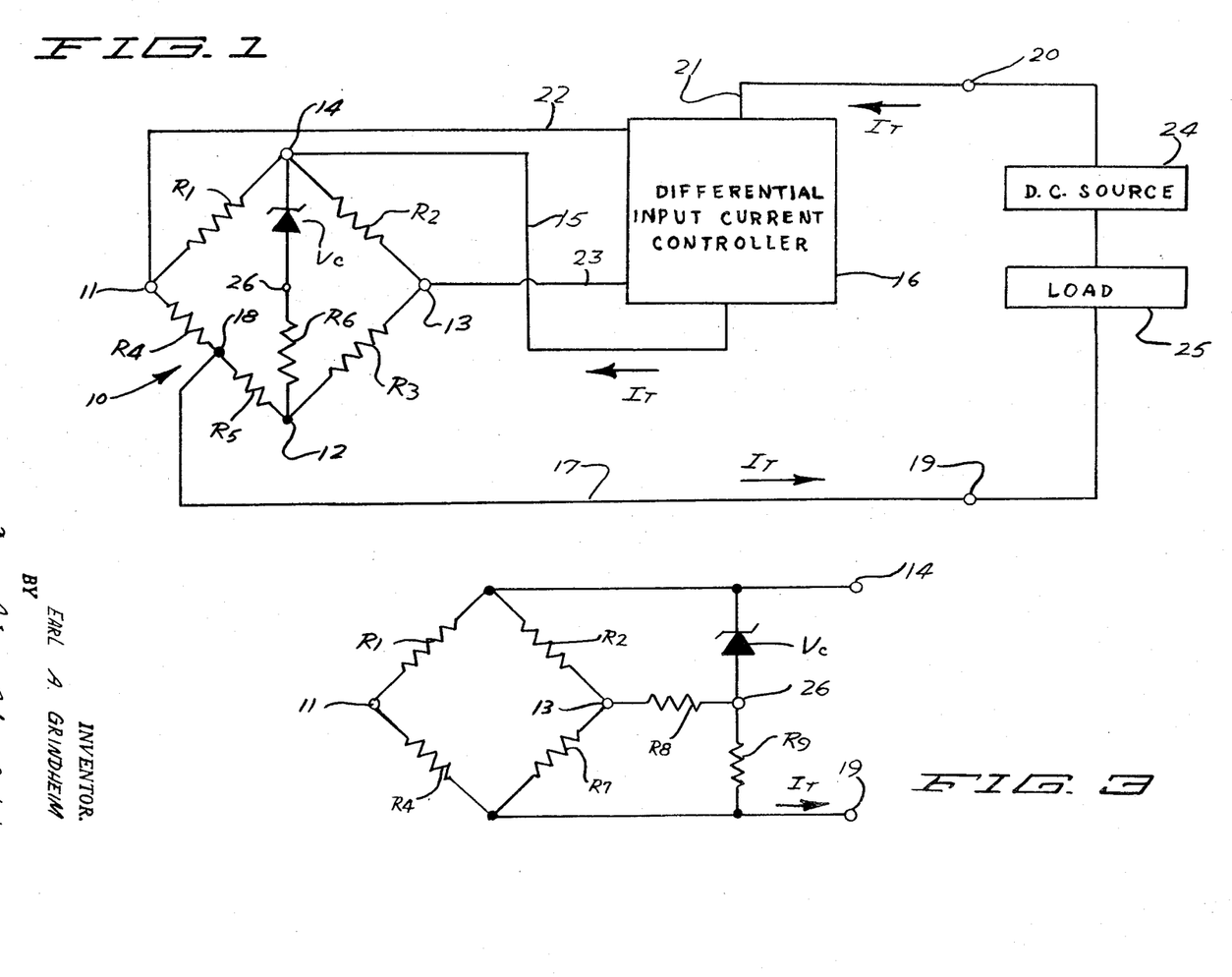
FIG. 1 is a schematic showing the basic circuit of the invention helpful in understanding the invention and the manner in which it is used.
FIG. 3 is a schematic showing an alternate arrangement of some of the basic circuit components.

Referring to the drawings and the reference notations thereon, FIG. 1 shows a closed series network 10 of resistors $R_1$ through $R_5$ connected in an arrangement which somewhat resembles a conventional bridge. Resistor $R_1$ is adjacent $R_2$ and opposite $R_3$ and the series combination of $R_4$ and $R_5$ is opposite $R_2$ with $R_4$ being connected to $R_1$ at signal output terminal 11 and $R_5$ connnected to $R_3$ at junction 12. Signal terminal 13 is between $R_2$ and $R_3$ and the anode of Zener diode $V_c$ is connected to terminal 14 between $R_1$ and $R_2$. The symbol $V_c$ designates a source of reference voltage having a voltage level of $V_c$ volts. The cathode of Zener diode $V_c$ is connected to one end of $R_6$ at terminal 26 and at the other end of $R_6$ is connected to junction 12. Total current drawn by the network 10 is designated $I_t$ and is shown as being received by line 15 which connects the output of a differential input current controller 16 to terminal 14. The total current $I_t$ leaves network 10 by line 17 which connects junction 18 between $R_4$ and $R_5$ to power return terminal 19. The total current $I_t$ is supplied to the current controller 16 from input terminal 20 which is connected to 16 by line 21. The signal terminals 11 and 13 connect to current controller 16 by lines 22 and 23 respectively. Controller 16 responds to a voltage difference between lines 22 and 23 in such a manner to reduce any such voltage to substantially zero by adjustment of total current $I_t$ and there is substantially zero current drawn by lines 22 and 23. A direct current source 24 and a load 25 are shown serially connected across terminals 19 and 20.

In operation a change in one or more of the resistors $R_1$ through $R_5$ as a result of a measurand change ("measurand" refers to the quantity or physical variable being measured such as temperature or strain) gives rise to a voltage signal between lines 22 and 23 which causes the controller to adjust the current level $I_t$ to reduce the voltage signal to zero. The change in current $I_t$ is thus a measure of change in resistance of one or more of the resistors $R_1$ through $R_5$ and this change in current is monitored by load 25 which may be a recorder for example. For an understanding of the circuit response assume that $R_6$ is zero. In this case the voltage across terminal 14 and junction 12 is a constant value $V_c$ regardless of the current flow through diode $V_c$. Accordingly the voltage on line 23 is held constant by $V_c$ so long as the ratio between $R_2$ and $R_3$ does not change. Then assuming $R_1$ is constant and $R_4$ is allowed to vary, the voltage on line 22 will rise with an increase in $R_4$. In order to have a self-balancing response this increase in voltage on line 22 must give rise to an increase in current $I_t$ from controller 16. The increase in current will not affect the voltage on line 23 (since it is assumed that for this example $R_6$ is zero) however it will have an opposing effect to the voltage on line 22 since it will give a change in voltage across resistor $R_5$ of opposite sign to the change in voltage across $R_4$ due to the assumed increase in resistance of $R_4$. Then to consider the effects of a finite value of $R_6$ assume $R_6$ to be of value such that the voltage drop across $R_6$ is small compared to $V_c$. Then an increased current through the series combination of $V_c$ and $R_6$, caused by an increase in $R_4$ for example, raises the voltage on line 23 by an amount proportional to the increase in voltage across $R_6$. The same percent increase would also be felt as a part of the voltage change on line 22. Since the voltage on line 22 is assumed to be greater than that on line 23 due to an increase in $R_4$ the effect of the increased voltage across $R_6$ is to require still more current $I_t$ to flow to reduce the voltage difference to zero between lines 22 and 23. Since $R_6$ introduces a correction or adjustment based upon the change in current $I_t$ its effect is a higher order effect and it may be used as such to selectively shape the relation between current $I_t$ and resistor $R_4$ for example. Analysis of the network 10 gives the following expression between $I_t$ and the various resistors shown:

$$(1) \quad I_t = \frac{V_c[R_2(R_4+R_5) - R_1R_3]}{R_1[R_5(R_2+R_3) + R_6(R_3+R_5)] - R_2R_4R_6}$$

It may be noted that if $R_6$ is zero the relation between $I_t$ and $R_4$ is linear and further that if $R_6$ is not zero the current $I_t$ will respond to positive changes in $R_4$ in an increasingly sensitive manner. It may also be noted that an increasing $R_2$ would result in $I_t$ increasing at a less than linear rate if $R_6$ is zero and at a rate selectible from less than linear to greater than linear if $R_6$ is finite. An increasing $R_1$ or $R_3$ would give a decreasing current $I_t$ and the rate of decrease would reduce whether or not $R_6$ was zero however the magnitude of reduction depends somewhat on $R_6$.

As a further example consider linearization of the relation between $I_t$ and temperature when a platinum resistance thermometer is used as the measurand sensing instrument. Picking $R_4$ as the thermometer the relation between resistance and temperature is $$R_4 = R_o(1 + \alpha T - \beta T^2) \quad (2)$$

for temperature zero degrees Celsius and higher where $R_o$ is the resistance at 0° C, $T$ is temperature in degrees Celsius and $\alpha$ and $\beta$ are constants. Substituting expression (2) into expression (1), expanding terms and solving for the condition causing disappearance of terms involving $T^2$ in the numerator gives $$(3) \quad R_6 = \frac{R_2 + R_3}{\frac{R_2}{R_1}\left[\frac{R_0}{R_5}\left(\frac{\alpha^2}{\beta} - 2\right) - 1\right] - 1}$$

Accordingly it is only necessary to satisfy expression (3) to achieve a linear relation between total current $I_t$ and temperature when a resistance thermometer such as platinum is used as $R_4$. Similar analysis may be made for the case where $R_2$ is a platinum thermometer. If the rate of resistance change as a function of temperature increases, as it does for a nickel wire thermometer for example, the element may be shunted by a constant resistance to linearize the response and it may then be used in place of $R_4$ with a zero value for $R_6$. A thermistor or thermistor network involving a series-shunt combination of resistors having a negative change of resistance with temperature would preferably be used in place of $R_1$ or $R_3$.

In some cases it is desirable to have more than one resistor response to the measurand. Resistance strain gage measurements commonly employ at least two resistors, one increasing with strain and one decreasing, and these would be preferably located in adjacent positions of network 10. If a temperature difference as sensed by two thermometers having like characteristics is to be measured these resistance thermometers would also be located in adjacent portions of network 10, for example in place of $R_4$ and $R_3$. A range or span adjustment can be conveniently made by adjustment of magnitude of $R_5$ and zero may be adjusted by $R_3$ for example.

In some instances it is desirable to use the circuitry shown for converting a low level voltage signal such as a thermocouple output to a controlled current signal. A thermocouple or other voltage signal may be introduced in series with one of the resistors $R_1$ through $R_5$ or by connection in series with, or across, current controller signal lines 22 and 23. Resistor $R_4$ may be selected to be temperature responsive also so that it serves as a reference junction compensation for a thermocouple having its reference junction adjacent $R_4$. In all such cases the differential input current controller responds to a voltage signal across lines 22 and 23 in such a manner to reduce that voltage to zero and the resulting current drawn by the circuit and available for measurement across load 25 bears a predetermined relation to the voltage signal and its origin.

Figure 2:
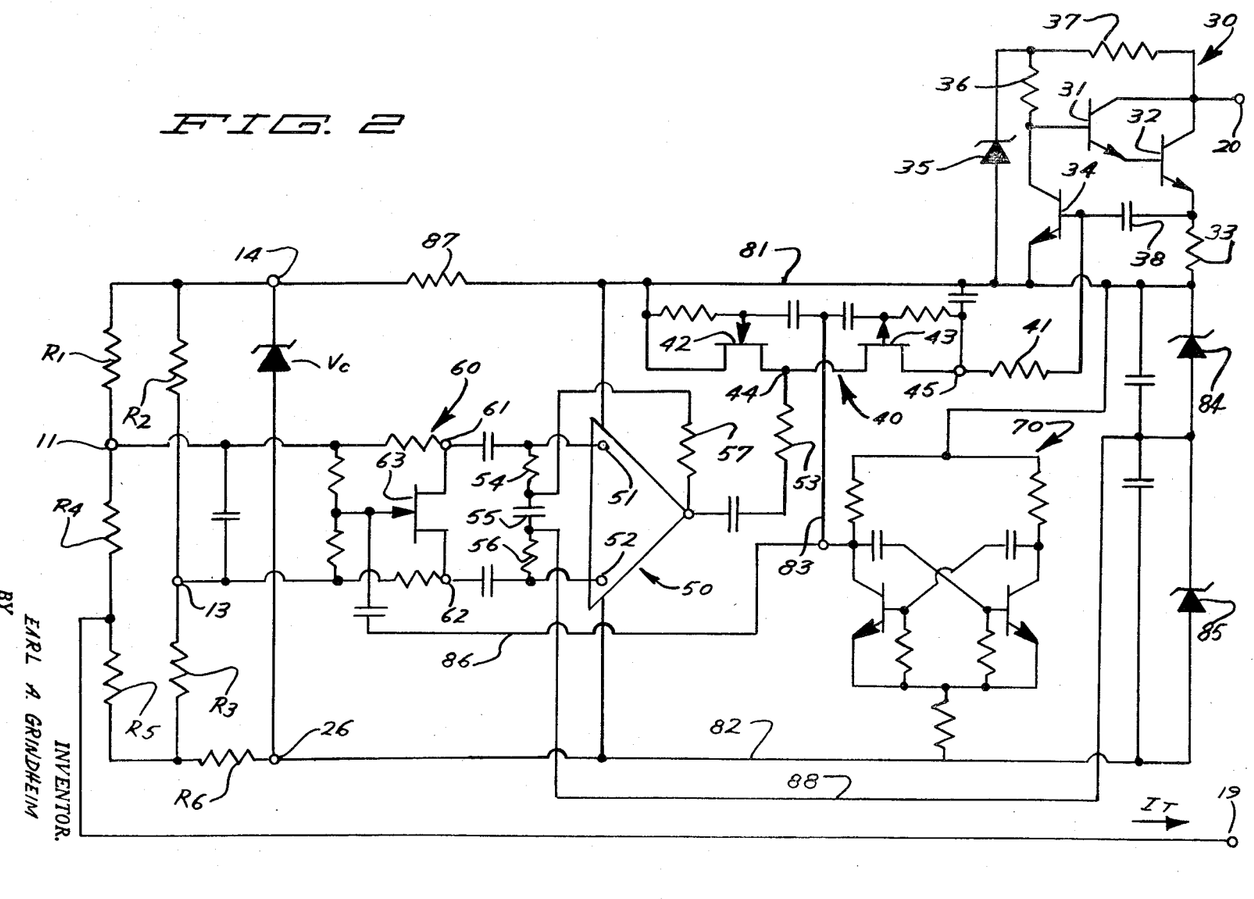
FIG. 2 is a circuit schematic showing details of a preferred embodiment useful for practicing the invention.

A detailed schematic of a differential input controller together with network resistors $R_1$ through $R_6$ and reference voltage $V_c$ is shown in FIG. 2. The system of FIG. 2 is a carrier amplifier type controller giving a high degree of freedom in choice of direct current voltage levels throughout the circuit. While a "straight" DC or non-carrier type controller may be used the carrier amplifier type controller generally gives overall higher performance than would be available with a direct current coupled amplifier.

The network resistors $R_1$ through $R_6$ and reference voltage $V_c$ are connected in FIG. 2 in the same arrangement of FIG. 1 however the main supply of controller feedback current is now delivered to the network at terminal 26 between $R_6$ and the cathode of Zener diode $V_c$. The circuit is arranged to receive direct current power at terminal 20 which connects to a current controller stage designated generally at 30. The current is controlled by stage 30 in response to a signal from a demodulator 40 which in turn connects to the output of a differential amplifier 50. Amplifier 50 responds to the signals across network terminals 11 and 13 which are coupled to amplifier 50 by a modulator 60. Modulator 60 and demodulator 40 are synchronously driven by a multivibrator 70 which is a square wave, symmetrical, free-running type multivibrator. The modulator 60 and demodulator 40 may be referred to as choppers and the multivibrator is a specific example of a chopper driver generating a wave form commonly referred to as chopper drive. The total current drawn by the circuit is effective in obtaining a zero voltage difference across network terminals 11 and 13 in the same manner as described with reference to FIG. 1 and consequently the current $I_t$ which would be measured by a serially connected load as was shown in FIG. 1 is accurately described by expression (1) when the circuit is operating in a balanced condition.

Current controller 30 includes a pair of transistors 31 and 32 having their collectors connected to input power terminal 20. These transistors form a Darlington amplifier since the emitter of 32 connects through resistor 33 to power line 81 which line is the main source of power for the other circuit elements. Controller 30 also includes transistor 34 and Zener diode 35 which operate to give a substantially constant current in the base to emitter circuits of 31 and 32 even though the input power supplied to terminal 20 may vary considerably in voltage level. The base of transistor 31 connects to the collector of 34 and connects through resistor 36 to the junctions between the anode of Zener diode 35 and resistor 37. The other end of resistor 37 connects to input terminal 20. The emitter of transistor 34 and cathode of diode 35 connect to line 81 and the base of transistor 34 connects to the output of demodulator 40 through resistor 41. A capacitor 38 is connected between the base of transistor 34 and the emitter of transistor 32 in order to shunt any high frequency components that may appear at transistor 34.

The demodulator 40 includes an N-channel field effect transistor 42 connected in series with a P-channel field effect transistor 43 at junction 44. The source of transistor 42 connects to line 81 and the source of transistor 43 connects to resistor 41 at demodulator output terminal 45. Resistors are respectively connected from gate to source of transistors 42 and 43 and the transistors are alternately made conducting and non-conducting by a capacitively coupled output signal on line 83 which is connected to the output of multivibrator 70. A positive signal on line 83 cuts off transistor 43 and turns on transistor 42 thereby effectively referencing the output of amplifier 50 to power line 81. The alternate negative signal on line 83 cuts off 42 and turns on 43 thereby coupling the output of amplifier 50 to the output terminal 45 of demodulator 40.

Amplifier 50 is a direct current integrated circuit differential amplifier having its output capacitively coupled to resistor 53 and thence to junction 44. Input power is obtained from line 81 and power return is to line 82. Amplifier signal input terminals 51 and 52 are capacitively coupled to modulator output terminals 61 and 62 respectively. The series combination of resistor 54, capacitor 55 and resistor 56 is connected between input terminals 51 and 52. The output of amplifier 50 is D.C. connected to the junction between resistor 54 and capacitor 55 by means of degenerative feedback resistor 57. This degenerative feedback of direct current signals insures that unwanted error signals such as thermoelectric potentials at the input terminals will have little effect on the amplifier control signal. An alternating voltage signal from modulator 60 will be amplified independently by amplifier 50 because of the capacitive coupling of both input and output terminals. The amplifier 50 is operated from a balanced voltage supplied by lines 81 and 82 which is maintained substantially constant by series connected Zener diodes 84 and 85. These diodes are of the same type and same voltage breakdown. The junction between the anode of 85 and the cathode of 84 is connected to the junction between capacitor 55 and resistor 56 at the input to amplifier 50 by line 88 thereby maintaining the input of amplifier 50 midway between the voltage on lines 81 and 82.

Modulator 60 includes field effect transistor 63 which is alternately made conducting and non-conducting by the multivibrator output capacitively coupled to the gate of transistor 63 from line 86. The output connections of transistor 63 connect directly to modulator output terminals 62 and 61 respectively. These output terminals are resistance coupled to network output terminals 11 and 13 respectively so that a D.C. output signal arising at terminals 11 and 13 from a network unbalance is alternately shorted and applied across amplifier terminals 51 and 52 at the frequency established by multivibrator 70.

Multivibrator 70 receives power from line 81 and has a power return to line 82. The multivibrator includes a pair of transistors oscillating in a continuous manner and, as shown, is of conventional design which requires no elaboration.

The basic operation of the circuit of FIG. 2 is similar to the description given in reference to FIG. 1. Amplifier 50 and current controller 30 function to maintain zero voltage between network terminals 11 and 13 and the total current drawn by the circuit is related to the network resistors $R_1$ through $R_6$ and reference voltage $V_c$ by expression (1). Amplifier 50 and multivibrator 70 are each powered between lines 81 and 82 which are maintained at substantially constant voltage by Zener diodes 84 and 85. Consequently the current component drawn by these elements is active in the network balance since the current return is from line 82 through linearizing resistor $R_6$ and current feedback resistor $R_5$ to output terminal 19. This current component is typically small and relatively constant and the main signal current is developed by virtue of a network unbalance resulting in a change in current through Zener diodes 84 and 85 and thence over line 82 through resistors $R_6$ and $R_5$ to output terminal 19. Resistor 87 couples power from line 81 to the anode of reference source $V_c$ which in turn supplies the network in the manner described with reference to FIG. 1. Resistor 87 substantially blocks the balancing current supplied from controller 30 from passing through reference element $V_c$ thereby minimizing any change in $V_c$ which might otherwise by caused by relatively large changes in current through $V_c$.

As an example of operability it was desired to deliver an output current varying from 10 to 50 milliamps for a temperature change from 0° C. to 100° C. as measured by a platinum resistance thermometer. A sensor resistance of nominally 100 ohms at 0° C. was selected and was simulated by a manually variable resistor substituted for $R_4$. Other network resistor values were 1.008 ohms for $R_5$, 2.26 ohms for $R_6$, 90.78 ohms for $R_3$ and 6187.2 ohms for each of $R_1$ and $R_2$. Reference source $V_c$ was a 1N-827 Zener diode having a nominal voltage of 6.2 volts and Zener diodes 84 and 85 were type 1N-4739 controlling at about 8.4 volts each. Resistor 87 was 1,850 ohms and the input voltage from the D.C. source 24 was approximately 60 volts. Amplifier 50 was a type 709C direct current operational amplifier manufactured by Fairchild Semiconductor, Mountain View, California and the other components were of size and type of maintain the various circuit elements within their design ranges of operation.

When resistance $R_4$ was varied to correspond to the well known resistance change of platinum with temperature the results of Table 1 were obtained.

TABLE 1

| Simulated Temperature | Resistance $R_4$ | Current $I_t$ |
|---|---|---|
| 0 deg. C | 100.00 ohms | 10.000 ma |
| 25 deg. C | 109.92 ohms | 19.999 ma |
| 50 deg. C | 119.77 ohms | 30.000 ma |
| 75 deg. C | 129.55 ohms | 40.004 ma |
| 100 deg. C | 139.25 ohms | 50.001 ma |

The results in Table 1 are one example of the close agreement which is obtained between a measurand and output current for the circuits herein disclosed. Although the example was for a current range of 10–50 ma for a 100 ohm temperature sensor and a 100° C. range it is apparent that the circuits are suitable for operation over a wide range of variables and the current range achieved may also be selected over a wide range while using the circuits which are described and illustrated herein.

An alternate schematic of the general network 10 shown in FIG. 1 is shown in FIG. 3. The network of FIG. 3 is substantially equivalent to network 10 and the operation follows the same formula relating total current, reference source $V_c$ and the resistors making up the network. The network of FIG. 3 was derived from 10 by transformation of the "wye" circuit comprising $R_3$, $R_5$ and $R_6$ of FIG. 1 to the "delta" circuit comprising resistors $R_7$, $R_8$ and $R_9$ of FIG. 3. Expression (1) may also be applied to the network arrangement of FIG. 3 where the following transformations apply:

$$(4) \quad R_7 = \frac{R_5 R_6 + R_5 R_3 + R_3 R_6}{R_6}$$

$$(5) \quad R_8 = \frac{R_5 R_6 + R_5 R_3 + R_3 R_6}{R_5}$$

$$(6) \quad R_9 = \frac{R_5 R_6 + R_5 R_3 + R_3 R_6}{R_3}$$

The network arrangement of FIG. 3 may be substituted directly into the circuit of FIG. 1 or the circuit of FIG. 2 by connecting terminals 11, 13, 14 and 19 to the terminals of like numbers in FIG. 1 or FIG. 2 and disconnecting the corresponding networks shown in those Figures. The current derived from differential input current controller 16 may be applied directly to terminal 14 as shown in FIG. 1 but in the preferred embodiment the major portion of the controlled current is delivered to the network at terminal 26 as was shown in the circuit description of FIG. 2.

In the use of an operational amplifier as shown, a minimum current is flowing through the circuit at all times that the unit is operational. Thus, the current controller output will range from a minimum flow of 10 ma, as shown in the example of Table 1, to a maximum flow of 50 ma. The change in resistance of the resistance sensor $R_4$ changes the balance of voltages at the controller input which changes the amount of total current flowing from the output. This in turn causes a change in the feedback signals, proportional to the current increase until the input signals are balanced. By measuring the total current in the circuit the measurand or temperature can be accurately determined. Another range of operation of the operational amplifiers used with the current controller is 4–20 ma, with 4 ma being the low current transmitted.

One of the requirements, therefore, is that the circuitry controlling the input to the current controller has means for balancing the inputs at a certain minimum current. The bridge circuit provides a means for doing this. The voltage at the terminal 11, which is raised by a change in resistance of $R_4$ is effectively reduced by the increase in current flowing through $R_5$. The voltage at terminal 13 will remain substantially constant, and provide a reference input at a very low level, as long as $R_6$ is zero. It is therefore within the concept of the present device to provide a reference voltage of some type, which could even be a ground, to one of the input terminals of the differential input current controller 16 and use the feedback voltage as a means to bring the voltages into balance with the reference.

Increasing the voltage at terminal 13 to balance the input signals (in other words raising one of the input signals for balance) is within the concept of the present invention. When two sensors are used, for example $R_3$ and $R_4$, both are temperature sensitive (which is typical in differential measurements), the voltage at terminal 13 will change as well as the voltage at terminal 11. The feedback current will still provide the balancing effect.

$R_6$, when it has a finite value, also causes a change of voltage at terminal 13 as well as at 11. Then, the current flow through $R_4$ (the sensor as shown) will increase. When $R_6$ is zero, the current through $R_4$ will remain constant. The increased current through $R_4$ increases its sensitivity to the measurand.

Figure 4:
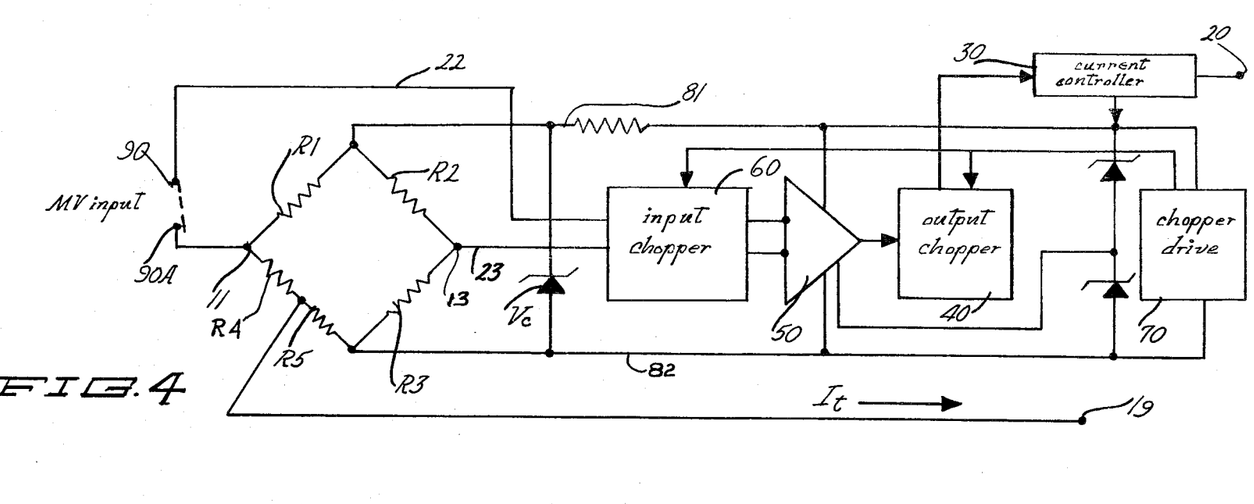
FIG. 4 is a schematic diagram showing the device of the present invention when a millivolt input is sensed by the circuitry.

Referring to FIG. 4, a schematic diagram showing basically the same circuitry as that in FIG. 2 in block form is shown. In this instance a separate millivolt input is provided between two input terminals 90 and 90A by the user of the transmitter system, and this millivolt input can be an unknown input from an external bridge, or from any other source that is to be monitored and measured. The terminals 90 and 90A can be shorted when the external signal source is disconnected, or they can be connected through a resistance.

The bridge circuit $R_1$, $R_2$, $R_3$ and $R_4$ is a fixed resistance bridge in this instance, that is selected to provide an adjustable zeroing circuit, and balance the voltages at junctions 11 and 13 when the minimum current generated by the current controller is flowing in the circuit.

When a customer has an input voltage range down to zero millivolts, the bridge is selected to have a certain voltage at terminals 11 and 13 when the minimum current is flowing.

When the customer has a low input voltage which is greater than zero, then the voltage at terminals 11 and 13 is selected to suppress this minimum input when the minimum current is flowing. By selecting the resistors $R_1$ through $R_5$ at proper value, the minimum current flow of the transmitter may be used to balance or suppress a minimum voltage signal at terminals 90 and 90A that is greater than zero.

In the case of a 10 to 50 ma range for the controller, all of the circuit components would be sufficiently powered or excited, so that any increase in current above 10 ma is in response to the controlling circuit. When a millivolt input is put across terminals 90 and 90A, this will boost the signal on line 22 and cause an unbalance between the lines 22 and 23. Then, this again will result in the current controller 30 increasing the current output to line 82. In this instance $R_6$ is zero (not in the circuit), and the flow will pass through the resistor $R_5$. This will in turn give a feedback signal across $R_5$ which acts as a reducing voltage on terminal 11, reducing the signal on line 22. This again restores balance between the lines 22 and 23. As $R_2$ and $R_3$ are fixed, the voltage at terminal 13 will not change, but will provide a reference. Effectively reducing the voltage between terminals 90 and 90A will cause a balance of the control or input signals to the current controller. The amount of reduction of voltage at terminal 11, of course, depends upon the current flowing through resistor $R_5$ which is, as shown, substantially the total increase in current caused by unbalanced input signals. As long as $R_5$ (the feedback resistor) passes a portion of the total current flowing, the voltage generated as a feedback signal will also change in proportion to the total current and therefore the voltage necessary to balance the signals at lines 22 and 23 gives an indication of the magnitude of the millivolt input between terminals 90 and 90A.

By measuring the total current through terminal 19 (this would again be connected in a series circuit with a DC source and a load) the magnitude of the millivolt input which is unknown can be obtained without disturbing the balance of the bridge itself. The bridge circuit acts as a reference, and gives a reference voltage for one of the input terminals to the chopper of the current controller and can suppress a desired minimum input voltage signal at terminals 90 and 90A. The voltage reference source $V_c$ provides a stable reference signal.

The voltage reference source $V_c$ passes a substantially constant portion of the current flowing in the circuit. The current increase caused by signal unbalance does not pass through the reference $V_c$ in the circuit shown in FIGS. 2 or 4 and $V_c$ stays at a precise, known voltage. A zero adjustment (at 10 ma current) for the system can be made if one of the resistances is made adjustable.

Figure 5:
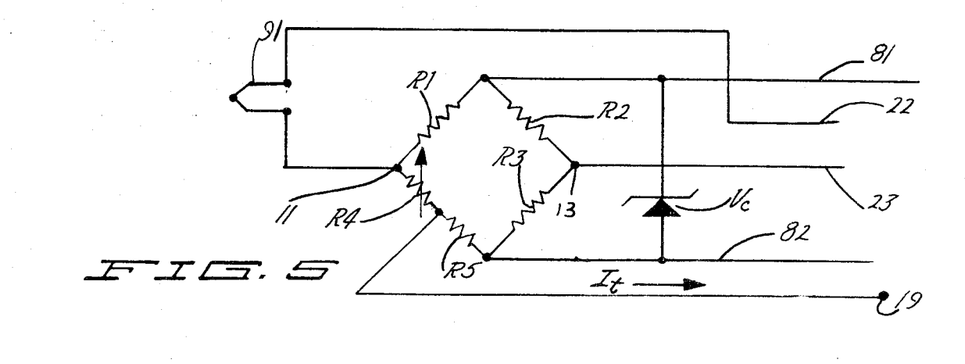
FIG. 5 is a further schematic diagram showing a thermocouple input.

FIG. 5 is substantially the same as FIG. 4 and uses the same sensing circuitry. Resistance $R_4$ is now made a temperature dependent resistance to provide cold junction compensation for a thermocouple shown at 91. Nickel has been found suitable for this resistor. The thermocouple 91 generates an input voltage signal to the current controller dependent upon temperature as a measurand and this signal will unbalance the lines 22 and 23. The current from the current controller 30 will again increase, increasing the current flow through the resistor $R_5$ which again provides the feedback signal. The resistor $R_5$ will then reduce the voltage signal in line 22 to balance the signals between lines 22 and 23 when the current from the current controller has reached a new level. Again, the bridge circuit provides a stable reference voltage (because of voltage reference element $V_c$) for one of the input signals to the controller, and also provides for a zeroing circuit. Cold junction compensation resistor $R_4$ is placed as close thermally to terminals for the thermocouple as possible. The signal from $R_5$ will balance out the millivolt input generated by the thermocouple.

Again, the entire circuit will be operating when the current controller is operating its normal minimum current, for example, a 10 ma current in a 10 to 50 ma range, and the bridge and the inputs will be balanced at this minimum current. The bridge can also be selected here to provide suppression of input voltages from the thermocouple below selected levels. Thus if the response is not required until a reference level is reached, the bridge provides means for suppression.

As the total current increases, because of the input voltage signal generated by thermocouple 91, the increase in current provides a feedback signal to balance the voltage at the current controller inputs. Open circuit protective resistors can be provided between line 22 and the bridge, if desired, to protect the transmitter in case the thermocouple breaks or is disconnected.

While the input to the controllers is shown connected to input terminals, the actual signal differentials between the signal to be measured and the feedback signal can be compared by means external of the amplifier and the resultant applied to an amplifier not having differential input terminals (a single ended input amplifier). This resultant is used to determine the level of current output from the current controller. The feedback has to be responsive in some manner to the total current flow, so that a new balance of signals can be achieved at a higher current flow in order to indicate the change in the voltage input either from the millivolt input between terminals 90 and 90A in FIG. 4, or from the millivolt input generated by the thermocouple 91.

In all instances, the entire power for powering the transmitter, and also the current, which is an indication of the unknown signals, are carried in two wires. Because the current is the measuring signal, and is at a relatively high level, problems with shielding and the like are minimized. The power supply and load can be located very remote from the transmitter apparatus.

There is no force rebalance at all, and further, two voltage signals are compared directly to establish unbalance or rebalance of the system.

What is claimed is:

1. Electrical apparatus comprising a first circuit having a current input and a current output, a current controller in said first circuit, a first DC voltage signal input means, a second DC voltage signal input means, amplifier and control means in said current controller connected to both of said signal input means for controlling the total current flow to the current output in response to voltage signals at said voltage signal input means, said controller being connected between said current input and said current output for receiving its power only through said current input, a resistance network connected in circuit with said controller through which at least a certain portion of the current flowing from the current controller flows to provide a feedback signal responsive to said current flowing through the current controller, and means electrically connecting said resistance network to one of the voltage signal input means to couple the feedback signal to said one voltage signal input means, said feedback signal modifying the signal at said one voltage signal input means in response to changes in current flow from the current controller through said resistance network to balance the voltage signals at the voltage signal input means, one of the voltage signal input means including a separate unknown source of voltage.

2. The electrical apparatus of claim 1 wherein said controller means operates at a predetermined minimum current flow, and circuit means connected to said resistance network and energized by a portion of the total current flow from the current input to provide a reference voltage for the other of the signal inputs, and being effective to maintain balance between the signal inputs with the predetermined minimum current flowing until the separate source of voltage exceeds a predetermined minimum level.

3. A two wire current transmitter comprising a current input terminal and a current output terminal for passing a current therebetween whose magnitude is proportional to a measured variable, a resistance network connected in series with said input and output terminals, said network having a first resistor which varies in magnitude as a function of a physical condition to provide a first voltage signal and a second resistor which provides a second voltage signal proportional to total transmitter current passing from said current input terminal, a voltage responsive current controller including amplifier means, current adjustment means controlled by said amplifier means, first and second current energization terminals and signal input terminal means, said current energization terminals being in series with said current input and output terminals and providing the sole energization for the controller, said current energization terminals also being in series with said second resistor, means connected between said resistance network and said signal input means for changing said first voltage signal in accordance with the magnitude of a variable condition, and voltage terminal means connected to said resistance network and said last-mentioned means, said last-mentioned means being connected to said signal input terminal means, so that the current adjustment means of said controller adjusts the transmitter current through said second resistor in response to said first and second voltage signals as modified by said last-mentioned means, said last-mentioned means including a thermocouple and said first resistor being temperature dependent to provide cold junction compensation for said thermocouple.

4. A two wire current transmitter comprising a pair of current terminals for passing a load current therebetween whose magnitude is proportional to a variable condition, a resistance network connected in series with said current terminals, said network including a first resistor through which a first portion of said load current flows to provide a first voltage at one location on said network and said network including a second resistor through which a second portion of said load current flows, said second current portion being a percentage of said load current, to provide a second voltage at a second location on said network which is proportional to said load current, a controller energized solely from said current terminals including voltage responsive means having a pair of voltage terminals and current adjusting means controlled by said voltage responsive means, means including a thermocouple connected between said one location and one of said voltage terminals for introducing a voltage signal changing in accordance with the magnitude of said variable condition, means connecting said current adjusting means in circuit with said second resistor to change the voltage at said one location in a direction so as to return the voltage applied to said voltage terminals to substantially the same value prevailing before a change in the magnitude of said variable condition occurred, whereby the load current comprised of said first and second current portions represents the magnitude of said variable condition.

5. A measuring system comprising a pair of current terminals, a source of direct current and a load connected in series between said current terminals so that all of the load current provided by said source flows through said load and said current terminals, a controller energized solely from said current terminals including a voltage responsive means and a current adjusting means in circuit with said current terminals controlled by said voltage responsive means, means connected to said voltage responsive means for applying a direct current voltage to said voltage responsive means that changes in value due to a change in magnitude of a variable condition so as to provide a current flow through said adjusting means the value of which is determined by the voltage supplied by said applying means, said voltage applying means including a separate unknown source of voltage, resistance means in circuit with said current adjusting means so that the current flowing through said adjusting means determines the current flowing through said resistance means and the voltage thereacross, means connecting said resistance means to said voltage applying means to utilize the voltage across said resistance means as determined by the adjusted current therethrough to return the value of voltage applied to said voltage responsive means to substantially its same value as before a change in voltage occurred due to a change in magnitude of said variable condition, whereby an adjustment in the value of current flowing through said current adjusting means also causes a change in value of load current which is representative of the change in magnitude of said variable condition.

6. The measuring system of claim 5 including voltage reference means connected in circuit with said resistance means for providing a reference voltage with respect to which said direct current voltage varies.

7. Electrical apparatus comprising a first circuit having a current input and a current output, a current controller in said first circuit, a first DC voltage signal input means, a second DC voltage signal input means, amplifier and control means in said current controller connected to both of said signal input means for controlling the total current flow to the current output in response to voltage signals at said voltage signal input means, said controller being connected between said current input and said current output for receiving its power only through said current input, a resistance network connected in circuit with said controller through which at least a certain portion of the current flowing from the current controller flows to provide a feedback signal responsive to said current flowing through the current controller, and means electrically connecting said resistance network to one of the voltage signal input means to couple the feedback signal to said one voltage signal input means, said feedback signal modifying the signal at said one voltage signal input means in response to changes in current flow from the current controller through said resistance network to balance the voltage signals at the voltage signal input means, one of the voltage signal input means comprising a thermocouple.

8. A measuring system comprising a pair of current terminals, a source of direct current and a load connected in series between said current terminals so that all of the load current provided by said source flows through said load and said current terminals, a controller energized solely from said current terminals including a voltage responsive means and a current adjusting means in circuit with said current terminals controlled by said voltage responsive means, means connected to said voltage responsive means for applying a direct current voltage to said voltage responsive means that changes in value due to a change in magnitude of a variable condition so as to provide a current flow through said adjusting means the value of which is determined by the voltage supplied by said applying means, said voltage applying means including a thermocouple, resistance means in circuit with said current adjusting means so that the current flowing through said adjusting means determines the current flowing through said resistance means and the voltage thereacross, means connecting said resistance means to said voltage applying means to utilize the voltage across said resistance means as determined by the adjusted current therethrough to return the value of voltage applied to said voltage responsive means to substantially its same value as before a change in voltage occurred due to a change in magnitude of said variable condition, whereby an adjustment in the value of current flowing through said current adjusting means also causes a change in value of load current which is representative of the change in magnitude of said variable condition.

9. The system of claim 8 including voltage reference means connected in circuit with said resistance means for providing a reference voltage with respect to which said direct current voltage varies.

10. A measuring system comprising a pair of current terminals, a source of direct current and a load connected in series between said current terminals so that all of the load current provided by said source flows through said load and said current terminals, a controller energized solely from said current terminals including a voltage responsive means and a current adjusting means in circuit with said current terminals controlled by said voltage responsive means, means connected to said voltage responsive means for applying a direct current voltage to said voltage responsive means that changes in value due to a change in magnitude of a variable condition so as to provide a current flow through said adjusting means the value of which is determined by the voltage supplied by said applying means, said voltage applying means including a pair of conductor lines and a separate unknown source of voltage in series with one of said lines, resistance means in circuit with said current adjusting means so that the current flowing through said adjusting means determines the current flowing through said resistance means and the voltage thereacross, means connecting said resistance means to said voltage applying means to utilize the voltage across said resistance means as determined by the adjusted current therethrough to return the value of voltage applied to said voltage responsive means to substantially its same value as before a change in voltage occurred due to a change in magnitude of said variable condition, whereby an adjustment in the value of current flowing through said current adjusting means also causes a change in value of load current which is representative of the change in magnitude of said variable condition.

11. A measuring system comprising a pair of current terminals, a source of direct current and a load connected in series between said current terminals so that all of the load current provided by said source flows through said load and said current terminals, a controller energized solely from said current terminals including a voltage responsive means and a current adjusting means in circuit with said current terminals controlled by said voltage responsive means, means connected to said voltage responsive means for applying a direct current voltage to said voltage responsive means that changes in value due to a change in magnitude of a variable condition so as to provide a current flow through said adjusting means the value of which is determined by the voltage supplied by said applying means, said voltage applying means including a pair of conductor lines and a thermocouple connected in series with one of said lines, resistance means in circuit with said current adjusting means so that the current flowing through said adjusting means determines the current flowing through said resistance means and the voltage thereacross, means connecting said resistance means to said voltage applying means to utilize the voltage across said resistance means as determined by the adjusted current therethrough to return the value of voltage applied to said voltage responsive means to substantially its same value as before a change in voltage occurred due to a change in magnitude of said variable condition, whereby an adjustment in the value of current flowing through said current adjusting means also causes a change in value of load current which is representative of the change in magnitude of said variable condition.

* * * * *